June 5, 1956  J. W. NAREL ET AL  2,748,544
GRINDING MACHINE
Filed Nov. 29, 1954  4 Sheets-Sheet 1

INVENTORS
JOSEPH W. NAREL
GLOVER C. JOYCE
BY
Harold W. Eaton
ATTORNEY

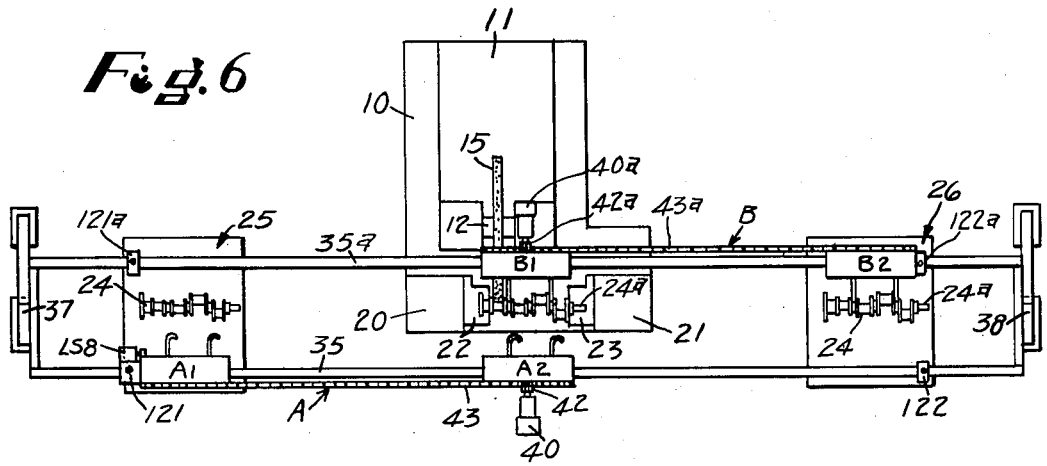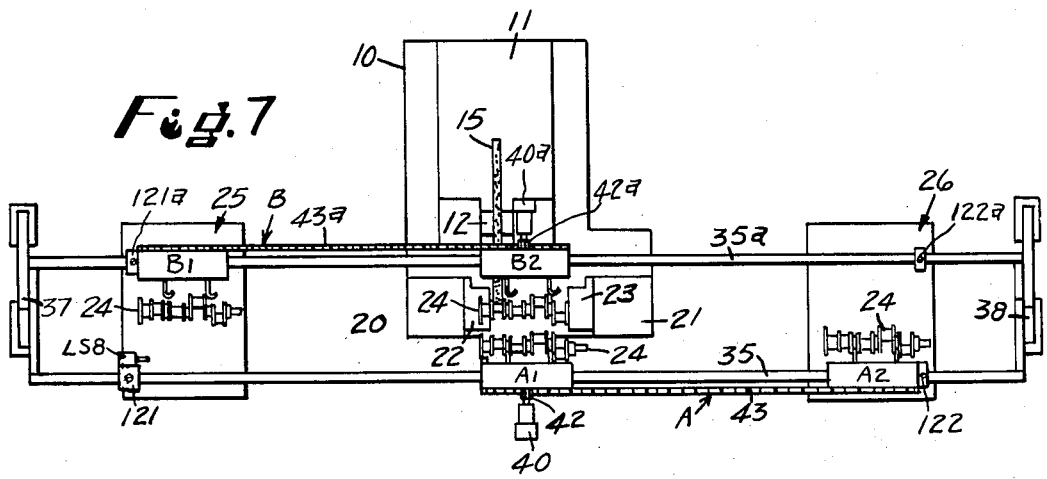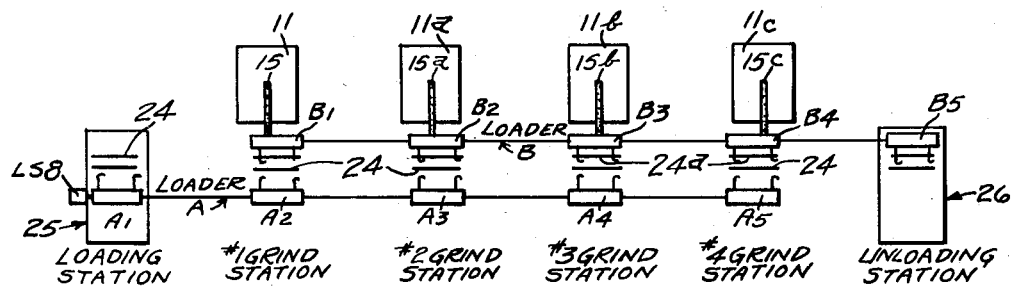

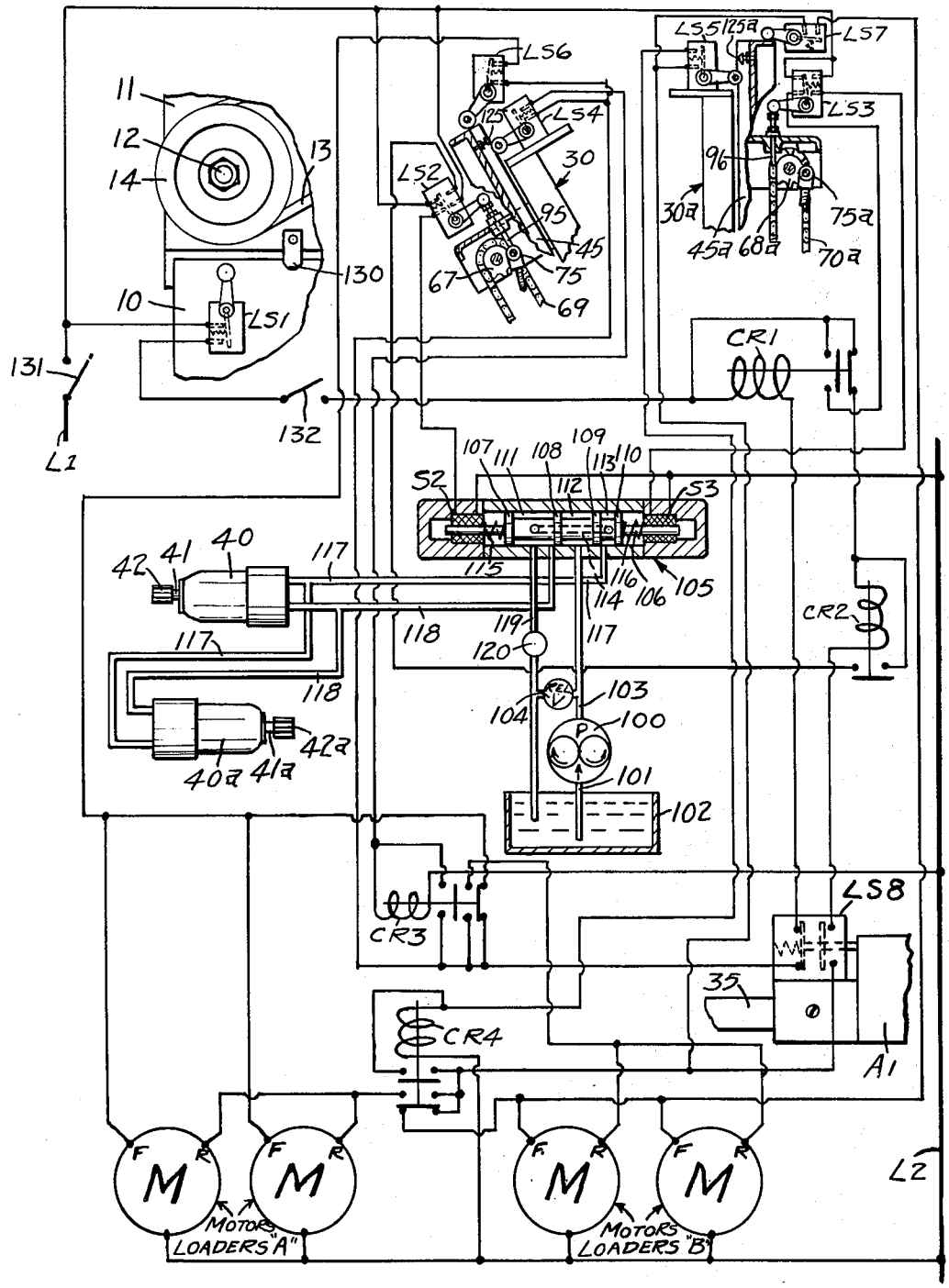

United States Patent Office 2,748,544
Patented June 5, 1956

2,748,544

GRINDING MACHINE

Joseph W. Narel and Glover C. Joyce, Worcester, Mass., assignors to Norton Company, Worcester, Mass., a corporation of Massachusetts Application November 29, 1954, Serial No. 471,738

7 Claims. (Cl. 51—105)

This invention relates to machine tools, and more particularly to an automatic work loading, transferring and discharge apparatus for loading work pieces into a grinding machine and unloading finished ground work pieces therefrom.

One object of the invention is to provide a simple and thoroughly practical work loading, transferring, and discharging apparatus for machine tools such as crankpin grinding machines. Another object is to provide a work loading unit for automatically picking up a work piece from a loading station, transferring it to a grinding station for a grinding operation and thereafter automatically transferring the work piece to an unloading station. Another object is to provide a duplex crankshaft loading mechanism whereby one loader unit is positioned to pick up a work piece after a grinding operation and a second loader unit adjacent thereto to deposit a new work piece in the grinding unit for a grinding operation. Another object of the invention is to provide a multiple station grinding machine with two sets of spaced loader units, one set being arranged to pick up a crankshaft from the loading station and to pick up a crankshaft from each of the grinding stations after which the second set of loader units deposit a crankshaft at each of the grinding stations and a ground crankshaft at the unloading station. Another object is to provide a longitudinal traversing mechanism for the two sets of loader units simultaneously to traverse the sets in opposite directions to facilitate rapid transfer of crankshafts from the loading station, station to station, and to the unloading station. Other objects will be in part obvious or in part pointed out hereinafter.

In the accompanying drawings in which is shown one of various possible embodiments of the mechanical features of the invention:

Fig. 6 is a diagrammatic plan view, on a reduced scale of a grinding machine equipped with a duplex crankshaft loading mechanism;

Fig. 7 is a similar fragmentary diagrammatic plan view showing the duplex crankshaft loader mechanism in the reverse positions;

Fig. 8 is a fragmentary diagrammatic plan view, showing the arrangement of the work loader units on a multiple grinding station machine, and Fig. 9 is a combined electric and hydraulic diagram of the actuating mechanisms and the controls therefor.

Figures 1, 2:
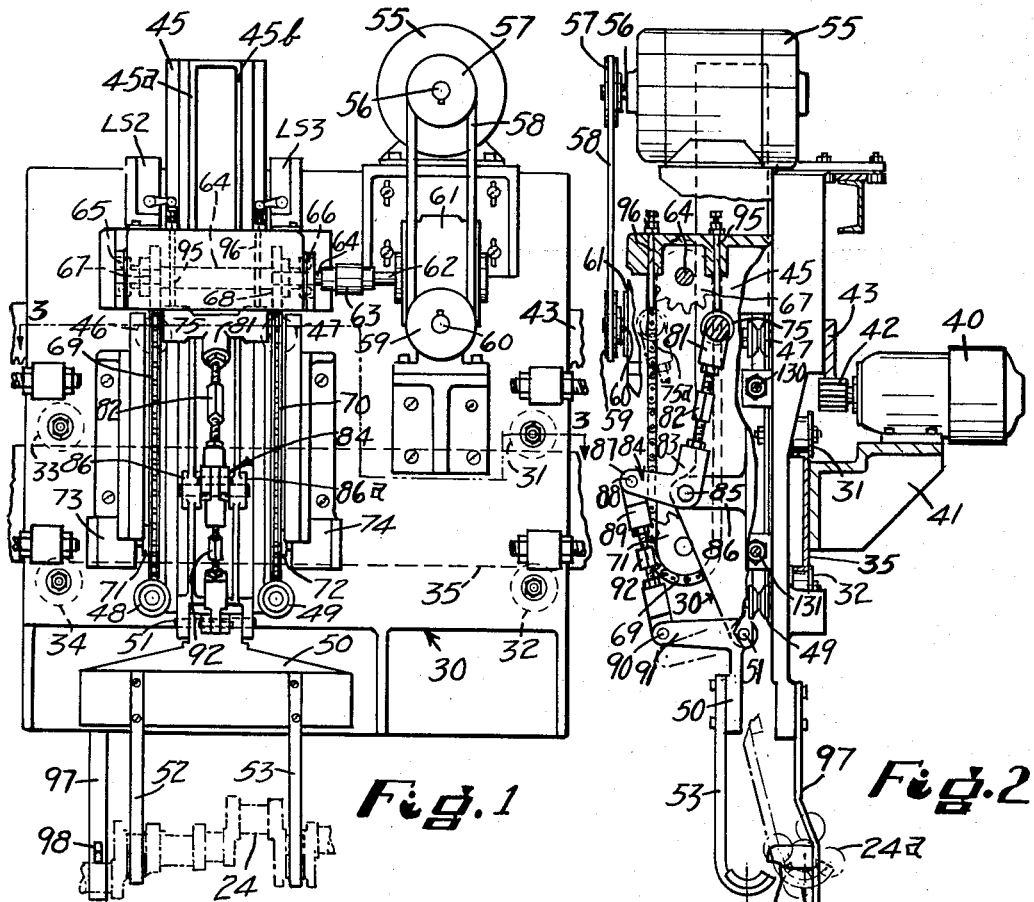
Fig. 1 is a front elevation of a work piece loading unit.
Fig. 2 is a right hand end elevation of the loading unit as shown in Fig. 1, having parts broken away and shown in section to clarify the construction.

A grinding machine has been illustrated in the drawings comprising a base 10 which supports a transversely movable wheel slide 11. The wheel slide 11 carries a rotatable wheel spindle 12 which may be driven by a motor (not shown) mounted on the wheel slide 11 which transmits power through multiple V-belts 13 to a multiple V-groove pulley 14 mounted on one end of the grinding wheel spindle 12. A grinding wheel 15 is mounted on the wheel spindle 12.

A wheel feeding mechanism is provided comprising a manually operable rotatable feed wheel 16 which is operatively connected to rotate a rotatable feed screw 17 which meshes with a half-nut 18 depending from the underside of the wheel slide 11. The details of the wheel feeding mechanism have not been illustrated since these may be identical with that shown in the U. S. Patent No. 2,572,529 to H. A. Silven dated October 23, 1951, to which reference may be had for details of disclosure not contained herein. A manually operable wheel feeding mechanism has been illustrated. If desired, a power operated feeding mechanism, such as that disclosed in the above mentioned patent may be employed.

This invention is particularly applicable to a crankshaft grinding machine which is provided with a pair of spaced aligned work heads 20 and 21 which are provided with synchronously rotated axially aligned pot chucks 22 and 23 respectively for supporting and rotating opposite ends of a crankshaft 24 to be ground. The crankshaft loading and transferring mechanism may comprise a plurality of work loader units for picking up a crankshaft to be ground from a loading station 25 and lifting the crankshaft and transferring it into engagement with the pot chucks 22 and 23 for a grinding operation. Simultaneously therewith a crankshaft which has been ground is picked up from the pot chucks 22 and 23 and raised and traversed and deposited upon an unloading station 26. As shown in Fig. 6 only one grinding unit has been illustrated which is arranged to grind a single crankpin or portion of the crankshaft to be ground. If desired, a plurality of grinding stations may be provided, one for each crankpin on the shaft to be ground, such as is disclosed in the pending application of H. A. Silven and Stewart S. Mader, Serial No. 434,484 filed June 4, 1954.

Figure 3:
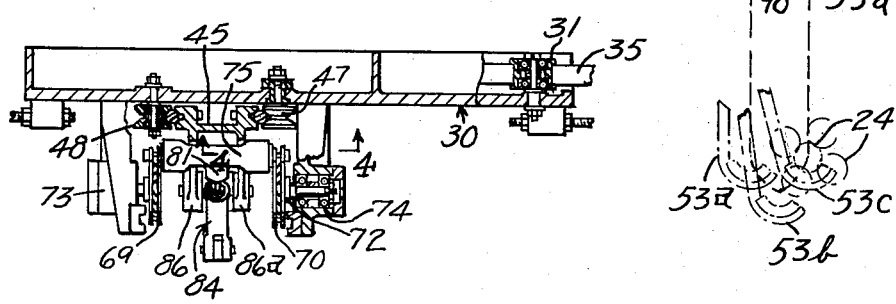
Fig. 3 is a horizontal sectional view, taken approximately on the line 3—3 of Fig. 1.

A longitudinally traversable loader unit 30 is illustrated in Figs. 1, 2 and 3. The loader unit 30 is provided with a plurality of spaced pairs of rollers 31—32 and 33—34 which ride upon the upper and lower surfaces of a longitudinally extending channel iron or slideway 35. The channel iron 35 is supported by a pair of spaced upwardly extending frames or columns 37 and 38 (Fig. 6). A traversing mechanism is provided for traversing the loader unit 30 longitudinally relative to the channel iron 35 which may comprise a fluid motor 40 supported on a bracket 41 which is fixedly mounted on the channel iron 35. The motor 40 is provided with a driven pinion 42 which meshes with a rack bar 43 fixedly mounted on the loader unit 30. It will be readily apparent from the foregoing disclosure that a rotary motion imparted to the pinion 42 will transmit a longitudinal traversing movement to the loader unit 30.

The loader unit 30 is provided with a vertically movable slide 45 which is supported by a plurality of pairs of anti-friction rollers 46—47 and 48—49 which are in turn supported on the loader unit 30. The slide 45 is arranged to move in a vertical direction in a manner to be hereinafter described. The slide 45 is provided with a pair of spaced parallel ribs 45a and 45b which serve to support the slide actuating mechanism. A pivotally mounted support 50 is supported by a stud 51 carried by the ribs 45a and 45b on the vertical slide 45. The pivotally mounted support 50 carries a pair of spaced vertically arranged work engaging hooks 52 and 53 which are arranged to engage spaced main bearings on the crankshaft 24 to be ground.

A suitable mechanism is provided for moving the slide 45 vertically and also to swing the pivotally mounted member 50 together with the hooks 52 and 53 to facilitate picking up a crankshaft from the loading station, raising it, transferring it longitudinally, lowering it and depositing it in supporting engagement with the pot chucks 22 and 23. This mechanism may comprise a motor driven mechanism comprising a reversible electric motor 55 mounted on the upper surface of the unit 30. The motor 55 is provided wtih a motor shaft 56 which supports a pulley 57. The pulley 57 is connected by a V-belt 58 with a pulley 59 mounted on the driveshaft 60 of a speed reducer unit 61. The speed reducer unit 61 may be of any of the well known speed reducer units now on the market. The speed reducer unit 61 is provided with a driven shaft 62 which is connected by a coupling 63 with a shaft 64 which is journalled in anti-friction bearings 65 and 66 carried by the loader unit 30. The shaft 64 is provided with a pair of spaced sprockets 67 and 68 which drives a pair of spaced parallel link chains 69 and 70. The lower ends of the chains 69 and 70 wrap around idler sprockets 71 and 72 respectively which are rotatably journalled in bearings 73 and 74 respectively carried by the loader unit 30. It will be readily apparent that rotary motion of the motor shaft 56 will be imparted through the mechanism just described to transmit motion to the link chains 69 and 70.

Figure 4:
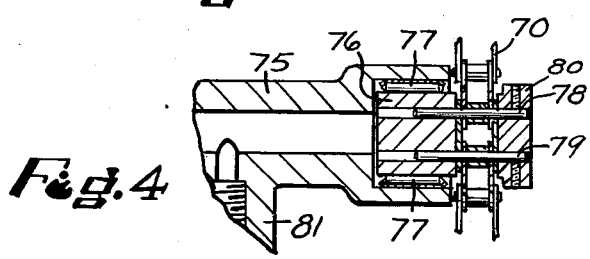
Fig. 4 is a fragmentary sectional view, on an enlarged scale, taken approximately on the line 4—4 of Fig. 3 showing the connection between the actuating chain and the vertically movable slide of the loader unit.

The link chains 69 and 70 are operatively connected in a manner to be hereinafter described to transmit a predetermined vertical movement to the slide 45 and also to impart a predetermined swinging movement to the member 50 and the working engaging hooks 52—53. A cross head 75 is connected at its opposite ends to the link chains 69 and 70 in a manner illustrated in Fig. 4. The cross head 75 rotatably supports a bushing 76 at opposite ends thereof in needle bearings 77. The bushing 76 is provided with a pair of spaced pins 78 and 79 which replace a pair of adjacent studs on the link chains 69 and 70. The pins 78 and 89 pass through a collar 80 which is secured thereto by a pair of set screws. The cross head 75 is provided with a downwardly extending arm 81 which is connected by a turnbuckle 82 with an upwardly extending arm 83 of a bell crank lever 84. The bell crank lever 84 is pivotally supported by a rock shaft 85 which is supported in projecting bosses 86 and 86a formed integral with the ribs 45a and 45b respectively on the vertically movable slide 45. A second arm 87 of the bell crank lever 84 is connected by a stud 88 with the upper end of a link 89. The lower end of the link 89 is connected by a stud 90 with an arm 91 which is formed integral with the pivotally mounted member 50. The link 89 is provided with a turnbuckle adjustment to facilitate varying the length of the link 89, that is, the distance between the stud 88 and the stud 90 so as to vary the position of the work engaging hooks 52 and 53. By manipulation of the turnbuckle 82, the slide 45 and hooks 52—53 may be vertically adjusted as desired. By manipulation of the turnbuckle 92, the relative position of the pivoted member 50 together with the hooks 52—53 may be varied to facilitate setting up the work loader unit.

The electric motor 55 is preferably a reversible motor so that the link chains 69 and 70 together with the cross head 75 may be moved in either a clockwise or a counter-clockwise direction (Fig. 2). As shown in Fig. 2, the cross head 75 is shown in an uppermost position so that it raises a plunger 95 to actuate a limit switch LS2. When the motor 55 is started to actuate the loader hooks 52—53 the link chains 69—70 start moving in a clockwise direction (Fig. 2) so that cross head travels downwardly in a U-shaped path and passes around the idler sprockets 71—72 and then moves upwardly into the broken line position 75a (Fig. 2) in which position the cross head 75 causes an upward movement of a plunger 96 to actuate a limit switch LS3.

During the downward movement of the cross head 75, a vertical movement is imparted to the vertical slide 45 to shift the loader hooks 52—53 downwardly into the position 53a (Fig. 2) in a substantially vertical path for the purpose of picking up a crankshaft to be ground from the loader station 25. At the time the loader hooks reach position 53a, the cross head 75 is about to start its travel about the idler sprockets 71—72 and due to the linkage previously described causes the loader hooks 52—53 to swing in a counterclockwise direction so as to move through position 53b into position 53c (Fig. 2) so that the hooks 52—53 engage spaced main bearings on a crankshaft 24. The cross head 75 then starts a vertical upward movement toward position 75a to raise the hooks 52—53 and crankshaft 24 into position 53d and 24a, respectively (Fig. 2) so that it is ready for a longitudinal traversing movement to transfer the crankshaft either from the loading station into the grinding station or from the grinding station into an unloading position.

A downwardly extending bracket 97 is fixedly mounted on the loader unit 30 (Fig. 2). The bracket 97 carries a cam 98 which is engaged by a crankpin on the crankshaft 24 as it moves upwardly into a transfer position to impart a rotary indexing movement to the crankshaft 24. This rotary indexing movement is provided to facilitate positioning the crankpin to be ground so that when the crankshaft 24 is transferred and lowered into engagement with the pot chcucks 22—23, the crankpin to be ground is positioned for a grinding operation.

A hydraulic system is provided for supplying fluid under pressure for actuating the fluid motor 40 to traverse the work loader units 30 longitudinally. This mechanism may comprise a motor driven fluid pump 100 which draws fluid through a pipe 101 from a reservoir 102 and passes fluid under pressure through a pipe 103. A pressure relief valve 104 is provided in the pipe 103 to pass excess fluid under pressure directly to the reservoir 102 so as to maintain a substantially uniform operating pressure within the fluid system.

A piston-type control valve 105 is provided for controlling the admission to and exhaust of fluid from the rotary-type fluid motor 40. The valve 105 is provided with a slidably mounted valve member 106 having a plurality of spaced valve pistons 107, 108, 109 and 110 arranged to form a plurality of spaced valve chambers 111, 112 and 113. A central passage 114 extends longitudinally through the slidably mounted valve member 106 so as to connect the valve chamber 111 with the valve chamber 113. The valve 105 is normally held in a central position by a pair of balanced springs 115 and 116. A solenoid S2 is provided which when energized shifts the slidably mounted valve member 106 toward the right. A solenoid S3 is provided which when energized serves to shift the valve member 106 toward the left.

When the solenoid S2 is energized, the valve member 106 moves toward the right so that fluid under pressure passed through the pressure pipe 103 passes into the valve chamber 112, passes through a pipe 117 to the motor 40 to start a longitudinal traversing movement of the work loader units 30 toward the left. During this movement fluid may exhaust from the motor 40 through a pipe 118 into the valve chamber 111 and through an exhaust pipe 119 into the reservoir 102. A throttle valve 120 is provided in the exhaust pipe 119 to facilitate controlling the rate of exhaust of fluid from the motor 40 thereby to control the rate of traversing movement of the work loaders 30.

Similarly when the solenoid S3 is energized, the valve member 106 is shifted toward the left so that fluid under pressure passing through the pressure pipe 103 enters the valve chamber 112, may pass through the pipe 118 to the motor 40 to rotate the pinion 42 in the reverse direction so as to travel the loaders 40 in the opposite direction. During this latter movement, fluid may exhaust from the motor 40 through the pipe 117 into the valve chamber 113, through the central passage 114 in the valve member 106 into the valve chamber 111 and exhausts through the pipe 119 and the throttle valve 120 into the reservoir 102.

Figure 5:
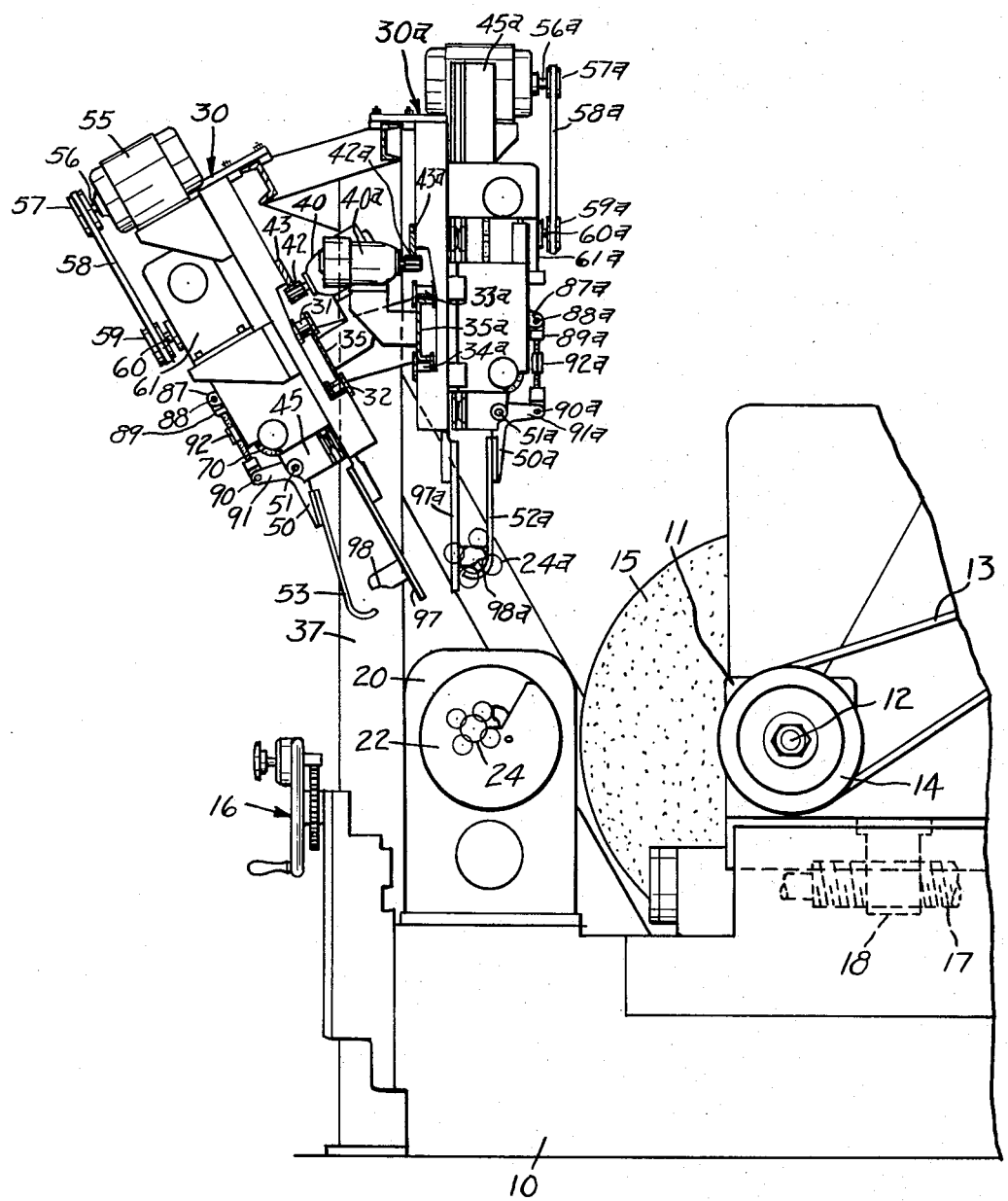
Fig. 5 is a right hand fragmentary end elevation, on a reduced scale, of a grinding machine equipped with a double crankshaft loading mechanism.

As shown in Figs. 1, 2, 3 and 4 a single work loading unit 30 has been illustrated. In order to obtain the maximum efficiency of the machine during loading operations, it is desirable to provide a double or duplex loading mechanism so that there is always a crankshaft to be ground located adjacent to the grinding station. As illustrated in Fig. 5 and diagrammatically in Figs. 6 and 7, a second channel iron 35a is provided which is supported at its opposite ends by the columns 37 and 38 respectively and is arranged parallel to the channel iron 35. The channel iron 35a supports a pair of spaced work loaders B1 and B2 (30a, Fig. 5) which are arranged to move in a substantially vertical direction (Fig. 5) whereas loaders A1 and A2 (30, Fig. 5) are arranged to move in an angle thereto to facilitate speeding up the loading operation. After a crankpin has been ground the loader 30 moves downwardly to pick up a crankshaft 24 from the pot chuck 22 (Fig. 5) and to raise it to a transfer position at which time the loader 30 which supports a crankshaft 24 to be ground moves downwardly to deposit the new shaft in the pot chucks 22. By providing the loaders arranged angularly relative to each other, a faster loading operation may be obtained. The loaders 30a (diagrammatically shown as loaders B1 and B2) are substantially identical in construction with loaders 30, corresponding parts being designated by the same reference numeral suffixed with the letter "a." The channel iron 35 is arranged to slidably support a pair of spaced loader units A1 and A2. The channel iron 35a is arranged to slidably support a pair of loader units B1 and B2 which are identical with the loader unit 30 as shown in Figs. 1, 2, 3 and 4. The loader units A1 and A2 are spaced apart by tie-rods to position the units in the desired spaced relationship relative to the loading-grinding-unloading stations. The loader units B1 and B2 are similarly spaced apart by tie-rods. The fluid motor 40 above described is provided to traverse the loader units A1—A2 longitudinally. A similar fluid motor 40a is supported on the channel iron 35a. The motor 40a is provided with a driving pinion 42a which meshes with a rack bar 43a, the opposite ends of which are fixedly mounted to loader units B1 and B2.

The channel iron 35 is provided with a pair of adjustable stops 121 and 122 which are arranged to limit the longitudinal movement of the loader units A1—A2. Similarly the channel iron 35a is provided with adjustable stops 121a and 122a (Figs. 6 and 7) to limit the endwise movement of the loader units B2—B1.

The fluid motors 40 and 40a are both controlled by the control valve 105. The motors 40 and 40a are arranged so that their driving pinions cause loaders A1—A2 and B1—B2 respectively to traverse simultaneously in opposite directions. A single grinding station arrangement has been illustrated in Figs. 6 and 7 with the loader units B1—B2 each supporting a crankshaft and located directly above the grinding station and the unloading station respectively. Loader units A1—A2 are in the extreme left hand end position with loader unit A1 located directly above the loading station and loader unit A2 located above the grinding station. After a grinding operation has been completed, loader hooks of units A1—A2 move downwardly to pick up a crankshaft from the loading station and from the grinding station respectively and to raise these shafts in a substantially vertical direction to a transfer position. When loader hooks of units A1—A2 reach an uppermost position, the loader hooks of units B1 and B2 move downwardly to deposit a shaft to be ground in the grinding station and a ground shaft on the unloading station after which a crankpin on the shaft in the grinding station may be ground. During the grinding operation loaders A1—A2 move simultaneously toward the right and loaders B1—B2 move simultaneously toward the left so that after a crankpin has been ground the hooks of loaders B1 and B2 move downwardly so that unit B1 picks up a crankshaft from a loading station and B2 picks up the crankshaft which has just been ground at the grinding station and raises these shafts to a transfer position after which loader unit A1 deposits a crankshaft to be ground at the grinding station and unit A2 deposits a ground crankshaft on the unloading station.

A multiple station grinding arrangement has been diagrammatically illustrated in Fig. 8, one station for each crankpin on the crankshaft to be ground, such as is disclosed in the pending application of H. A. Silven and S. S. Mader Ser. No. 434,484 filed June 4, 1954. As illustrated a grinding machine is provided with a plurality of wheel slides 11, 11a, 11b and 11c which support grinding wheels 15, 15a, 15b and 15c for grinding a plurality of crankpins on a crankshaft to be ground. A double or duplex work loader mechanism has been illustrated comprising work loaders A consisting of work loader units A1, A2, A3, A4 and A5 and work loaders B comprising loader units, B1, B2, B3, B4 and B5. The loaders A and B are arranged to operate in the same manner as that described in connection with Figs. 5, 6, and 7.

Assuming loaders B to be in a right hand end position and loaders A in a left hand end position and loaders B are each supporting a crankshaft, after the wheel slides 15, 15a, 15b and 15c move rearwardly, a limit switch LS1 is actuated in a manner to be hereinafter described to start operation of the loader mechanism. The hooks of loader units A1, A2, A3, A4 and A5 move downwardly so that loader A1 picks up a crankshaft from the loading station and loaders A2, A3, A4 and A5 simultaneously pick up ground crankshafts from grinding stations No. 1, No. 2, No. 3 and No. 4 and raise the shafts substantially vertical to a transfer position. The hooks of loaders B1, B2, B3, B4 and B5 then move downwardly to deposit a crankshaft at grinding stations Nos. 1, 2, 3, and 4 respectively and loader B5 deposits a crankshaft on the unloading station 26. The grinding operation then proceeds so that at each of the grinding stations a crankpin on the shafts being ground is ground to the desired and predetermined extent. During this grinding operation, loaders A, that is, units A1, A2, A3, A4 and A5 move toward the right and at the same time loaders B, that is, units B1, B2, B3, B4 and B5 move simultaneously to the left hand end position so that they are ready for the next loading operation. By use of this double or duplex arrangement there is always a crankshaft to be ground positioned above each of the grinding stations so that after a grinding operation has been completed, the shaft which has been ground may be quickly removed and replaced with a new shaft without the necessity of waiting for a traversing movement of the loader assemblies.

Where a single work loader is employed, a pair of vertically arranged plungers 95 and 96 actuated by the cross head 77 are arranged to actuate limit switches LS2 and LS3 respectively. Where a double or duplex arrangement of loader units is utilized, it is necessary to coordinate the movements of the loader units. As illustrated diagrammatically in Fig. 9, loader unit 30 is provided with a slidably mounted plunger 95 which is arranged to actuate the limit switch LS2 when the cross head 75 is in its uppermost position after a counter-clockwise movement thereof. Similarly the loader unit 30a (Figs. 5 and 9) is provided with a slidably mounted plunger 96 which is actuated by the cross head 75a when it reaches its uppermost position when moved in a clockwise direction to actuate the limit switch LS3.

The vertical movement of the slide 45 of the loader unit 30 is arranged to actuate a limit switch LS6. During movement of the slide 45, a screw 125 on the slide 45 is arranged to momentarily close a limit switch LS4. Similarly the slide 45a of the loader unit 30a when moved vertically is arranged to actuate a limit switch LS7 at the upper end of its stroke. During the vertical movement of the slide 45a an adjustable screw 125a serves to momentarily close the limit switch LS5.

Each of the grinding units is provided with a normally open limit switch LS1 which is momentarily closed during the rearward movement of each of the wheel slides 11 by means of an adjustable dog 130 carried by the wheel slide. A limit switch LS8 having a pair of normally open contacts and a pair of normally closed contacts is actuated by loader unit A1 when A1 is traversed toward the left into its extreme left hand end position. A pair of switches 131 and 132 are provided for rendering the control circuits operative when it is desired to start the operation of the loading and transferring mechanisms.

The reversible electric motors 55 on each of the work loader units are provided to facilitate moving the work engaging hooks of loaders A and loaders B through a U-shaped path in either a clockwise or counter-clockwise direction as will be hereinafter described. Where a multiple grinding station unit is provided the controls for all of the motors 55 on loader units A1, A2, A3, A4 and A5 are connected in parallel so that all of the loader units complete their function before the loaders B1, B2, B3, B4 and B5 start to function. Similarly the reversible motor 55 on the loader units B1, B2, B3, B4 and B5 are connected so that all of their cycles must be completed before the traversing movements of loaders A and B are started.

Assuming work loaders A, that is, units A1, A2, A3, A4 and A5 are in their left hand end position and unit A1 has closed the normally open contacts of limit switch LS8, the units are then ready to pick up shafts from the loading station and each of the grinding stations. The loaders B at this time are in their extreme right hand end position, each carrying a shaft to be ground for depositing at each grinding station and at the unloading station. When each of the wheel slides 11, 11a, 11b and 11c move rearwardly after finish grinding a crankshaft, the limit switches LS1 are momentarily closed to energize a relay switch CR1 thereby starting the reversible motors 55 on loaders A1, A2, A3, A4 and A5 so as to cause a downward movement of the loader hooks to pick up a crankshaft from the loading station and from each of the four grinding stations. The energizing of relay switch CR1 completes a circuit through the normally open contacts of limit switch LS8 which are now closed by loader unit A1 through the normally closed contacts of a relay switch CR3 to start the motors 55 as for the pick up operation. A holding circuit is set up through the normally closed contacts of LS3 to maintain the relay switch CR1 energized to keep the motors 55 on loaders A operating until the limit switch LS6 is again opened when the slide 45 of loader units A1, A2, A3, A4 and A5 reach their uppermost positions. The movement of the slides 45 causes the screw 125 to momentarily actuate the limit switch LS4. This momentary contact completes a circuit to energize the relay switch CR3 so that the normally closed contacts thereof open and the normally open contacts thereof close. Limit switch LS6 being closed keeps the motors 55 of loaders A operating until the slides reach their uppermost position even though the normally closed contacts of relay switch CR3 open. The normally open contacts of relay switch CR3 close to start motors 55 on loaders B in a reverse direction, that is, so that the cross head 75a (Fig. 9) travels in a clockwise direction through a U-shaped path. A holding circuit through limit switch LS3, relay switch CR1 and limit switch LS3 and relay CR3 is held closed until the slide 45 of the loaders B move the work engaging hooks downwardly to load crankshaft into the machine and then move up again to an uppermost position so as to open the normally closed contacts of the limit switch LS3. This serves to break the holding circuit to relay switches CR1 and CR3 so as to stop all of the motors 55 and 55a on the loaders A and B. The normally open contacts of limit switch LS3 are closed by the upward movement of the plunger 96. When the relay switches CR1 and CR3 are deenergized the normally closed contacts of CR3 and CR1 are closed. When the normally opened contacts of LS3 are closed, the solenoid S3 is energized to shift the valve member 106 toward the left to start the loader traversing motors 40 and 40a so that loaders A traverse toward the right and loaders B simultaneously traverse toward the left.

When loaders A start traversing toward the right, the normally open contacts of the limit switch LS8 open and the normally closed contacts thereof close. While loaders are traversing, crankpins of crankshaft supported at each of the grinding stations which loaders B deposited therein are simultaneously ground. When these crankpins are finish ground and all of the wheel slides move rearwardly to an inoperative position, the limit switches LS1 are momentarily actuated, this time serving through the normally closed contacts of relay switch CR1 to energize relay switch CR2, because at this time relay CR1 is deenergized. The energizing of relay CR2 starts a forward movement of the motors 55a on loader units B1, B2, B3, B4 and B5 so that loader hooks move through a U-shaped path in a counter-clockwise direction. The energization of the relay CR3 operates through the normally closed contacts of the limit switch LS8 and through the normally closed contacts of relay CR4 to start the motors 55a of loader units B as above explained. A holding circuit is set up through the previously closed normally closed contacts of LS2, and relay CR2 to keep the motor 55a running. Loaders B, that is, units B1, B2, B3, B4 and B5 start moving so that the cross head 75a travels in a counter-clockwise direction. At the start of this operation, the normally open contacts of the limit switch LS3 open and the normally closed contacts thereof close. The hooks of loaders B1, B2, B3, B4 and B5 move downwardly through a U-shaped path to pick up crankshafts and raise them to a transfer position.

During this movement the limit switch LS5 is momentarily closed and the upward movement of the slides 45a opening the normally closed contacts of limit switch LS7 serves to break a circuit to stop the motor 55a of the loaders B.

The momentary closing of the normally open contacts of the limit switch LS5, serves to close a circuit so as to energize the relay switch CR4. The normally open contacts of relay CR4 close and the normally closed contacts of CR4 open, but as stated above LS5 maintains a holding circuit to keep the motors 55a of the loaders B running until the normally closed contacts of limit switch LS7 open. The normally open contacts of CR4 close and start the motors 55 of loaders A, that is, units A1, A2, A3, A4 and A5 in the reverse direction to deposit crankshafts at the grinding stations and the unloading station. A holding circuit through the limit switch LS2, the relay switch CR3, normally closed contacts of limit switch LS8, through relay CR4, maintains the motors 55 operating until the normally closed contacts of limit switch LS2 are opened and the normally open contacts of LS2 are closed. Opening the normally closed contacts of limit switch LS2 breaks the holding circuit through relay CR2, limit switch LS8, relay CR4 to stop all of the motors 55.

When the loaders A return to their uppermost positions, the normally open contacts of limit switch LS2 close to energize the solenoid S2 thereby shifting the valve member 106 toward the right to start the loader traversing motors 40 and 40a in the reverse direction so that work loaders A traverse toward the left and work loaders B simultaneously traverse toward the right. The crankpins loaded into the several grinding stations by loaders A are then ground to the desired and predetermined extent. This cycle of operation of the work loaders A and B continues to repeat automatically until the switches 131 and 132 are manually opened when it is desired to stop the operation of the work loader units.

The operation of this improved work loading apparatus will be readily apparent from the foregoing disclosure. When it is desired to render the loading apparatus operative, the switches 131 and 132 are closed, assuming a crankshaft to be positioned in each of the grinding stations and loaders B, that is, loader units B1, B2, B3, B4 and B5 to be carrying a crankshaft, loader units B1, B2, B3, and B4 having crankshafts to be ground and loader unit B5 have a ground crankshaft. After the crankshafts in grinding stations Nos. 1, 2, 3 and 4 have been ground to the desired and predetermined extent, the grinding wheel slides 11, 11a, 11b and 11c move rearwardly to an inoperative position during which movement dog 130 actuates limit switch LS1 which causes the hooks of loaders A, that is, loader units A1, A2, A3, A4 and A5 to move downwardly so that loader unit A1 picks up a crankshaft from the loading station 25 and units A2, A3, A4 and A5 pick up ground crankshafts from grinding stations Nos. 1, 2, 3 and 4 and raises these shafts to a transfer position.

As soon as the loaders A reach an uppermost or transfer position, this initiates a downward movement of the hooks of loaders B, that is, loader units B1, B2, B3, B4 and B5 to deposit crankshafts to be ground at grinding stations Nos. 1, 2, 3, and 4 and loader unit B5 deposits a completely ground crankshaft on the unloading station 26. The hooks of loader B then move upwardly to a transfer position which initiates a longitudinal movement of the loaders A and B so that loaders A traverse toward the right and loaders B traverse toward the left to position the loaders for the next loading operation. During this longitudinal movement of loaders A and B, a grinding operation is proceeding at grinding stations Nos. 1, 2, 3, and 4. At each of these grinding stations a different crankpin on a crankshaft is being ground so that after the crankshaft passes through the four grinding stations, the crankpins are completely ground, this traversing movement of the loaders A and B locates the loader units in position so that after the grinding operation has been completed on the crankshafts in the grinding stations Nos. 1, 2, 3 and 4, the wheel slides move rearwardly to inoperative positions to again actuate limit switch LS1 to initiate a loading cycle.

On this second loading cycle, the hooks of loaders B, that is, units B1, B2, B3, B4 and B5 move downwardly so that loader B1 picks up a crankshaft from the loading station 25 and loader units B2, B3, B4 and B5 pick up crankshafts at grinding stations Nos. 1, 2, 3 and 4 respectively. The hooks of loaders B then move upwardly to a transfer position which movement initiates a downward movement of the hooks of loader A, that is, loader units A1, A2, A3, A4 and A5 so that loader units A1, A2, A3, and A4 deposit crankshafts to be ground at grinding stations Nos. 1, 2, 3 and 4 respectively and loader unit A5 deposits a completely ground shaft on the unloading station 26.

This cycle of operation is continued as long as the grinding operation proceeds and may be interrupted only by actuation of the limit switches 131 and 132. It will be readily apparent that by this double or duplex arrangement of loaders, the loss time due to traversing of the loader units is reduced to a minimum thereby increasing the efficiency of the grinding machine.

The work loader units disclosed in this application are substantially identical with those disclosed in our copending application Serial No. 467,306 filed November 11, 1954.

It will thus be seen that there has been provided by this invention apparatus in which the various objects hereabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a loading station, a grinding station, an unloading station, a pair of spaced axially aligned rotatable work supporting chucks on said grinding station, a transversely movable rotatable grinding wheel on said grinding station, a feeding mechanism to move said grinding wheel toward and from said chucks, a work loading and transferring mechanism including a pair of spaced parallel horizontal slideways, a set of spaced longitudinally movable work loader units on each of said slideways, means including a motor operatively connected simultaneously to traverse said sets of loader units in opposite directions, means to reverse said motor, a pair of spaced movable work engaging hooks on each of said units, means including a reversible motor on each of said units operatively connected to move said hooks through a substantially U-shaped path in either direction, means actuated by and in timed relation with the rearward movement of the grinding wheel to start said reversible motors on one set of loader units so as to cause a downward cycle of the work engaging hooks to pick up work pieces at the loading and grinding stations and to raise the work pieces to a transfer position, means actuated by the upward movement of said loader hooks to start said reversible motors of the other set of loader units so as to initiate a downward cycle of the loader hooks to deposit work pieces in the grinding station and the unloading station, and means actuated by and in timed relation with movement of said latter hooks to actuate said reverse means so as to cause a simultaneous longitudinal movement of the sets of work loader units in opposite directions.

2. In a grinding machine having a loading station, a grinding station, an unloading station, a pair of spaced axially aligned rotatable work supporting chucks on said grinding station, a transversely movable rotatable grinding wheel on said grinding station, a feeding mechanism to move said grinding wheel toward and from said chucks, a work loading and transferring mechanism including a pair of spaced parallel horizontal slideways, a set of spaced longitudinally movable work loader units on each of said slideways, means including a fluid motor simultaneously to traverse said sets of loader units in opposite directions, a control valve therefor, a pair of spaced movable work engaging hooks on each of said units, means including a reversible motor on each of said units operatively connected to move said hooks through a substantially U-shaped path in either direction, means actuated by and in timed relation with the rearward movement of the grinding wheel to an inoperative position to start the reversible motors of one set of loader units so as to cause a downward cycle of the work engaging hooks to pick up work pieces at the loading and grinding stations and to raise the work pieces to a transfer position, means actuated by the upward movement of said loader hooks to start said reversible motors on the other set of loader units so as to initiate a downward cycle of the work engaging hooks to deposit work pieces in the grinding station and the unloading station, and means actuated by and in timed relation with movement of said latter hooks to actuate said valve so as to cause a simultaneous longitudinal movement of the sets of loader units in opposite directions.

3. In a grinding machine having a loading station, a grinding station, an unloading station, a pair of spaced axially aligned rotatable work supporting chucks on said grinding station, a transversely movable rotatable grinding wheel on said grinding station, a feeding mechanism to move said grinding wheel toward and from said chucks to facilitate grinding a work piece to the desired extent, and a work loading and transferring mechanism including a pair of spaced parallel horizontal slideways, a set of spaced longitudinally movable loader units on each of said slideways, means including a fluid motor simultaneously to traverse said sets of loader units in opposite directions, a control valve therefor, a vertically movable slide on each of said units, a pair of spaced work engaging hooks on each of said slides, means including a reversible motor driven chain on each of said units operatively connected to move said hooks through a substantially U-shaped path in either direction, means including a limit switch actuated by and in timed relation with the rearward movement of the grinding wheel to start said reversible motors on one set of loader units to cause a downward cycle of the work engaging hooks to pick up a work piece at the loading and grinding stations and to raise them to a transfer position, means including a limit switch actuated by the upward movement of said loader hooks to start said reversible motors on the other set of units to initiate a downward cycle of the work engaging hooks to deposit a work piece in the grinding station and the unloading station, and means including a limit switch actuated by and in timed relation with movement of said latter hooks to actuate said valve so as to cause a simultaneously longitudinal movement of sets of loader units in opposite directions.

4. In a grinding machine, as claimed in claim 3, in combination with the parts and features therein specified of means including a limit switch actuated by and in timed relation with the longitudinal traversing movement of the loader units to reverse the operation of said loader units after the next grinding operation has been completed.

5. In a grinding machine as claimed in claim 3 in combination with the parts and features therein specified of means including a pair of relay switches operatively connected to control the direction of rotation of said reversible motors, and means including a limit switch actuated by and in timed relation with the longitudinal traversing movement of the loader units to render one or the other of said relay switches operative so as to reverse the sequence of operation of said loader units after each successive grinding operation.

6. In a grinding machine having a loading station, a plurality of spaced grinding stations, one station for each portion of the work piece to be ground, an unloading station, a pair of spaced axially aligned rotatable work supporting chucks on each of said grinding stations, a transversely movable rotatable grinding wheel on each of said grinding stations, a feeding mechanism to move said grinding wheels transversely in either direction, and a work loading and transferring mechanism for transferring work pieces between said stations including a pair of spaced parallel horizontal slideways, a set of spaced longitudinally movable work loader units on each of said slideways, means including a motor simultaneously to traverse said loader units in opposite directions, means to reverse said motor, a pair of spaced work engaging hooks on each of said slides, means including a reversible motor on each of said units for moving said hooks through a substantially U-shaped path in either direction, means actuated by and in timed relation with the rearward movement of the grinding wheel to an inoperative position simultaneously to start all of said reversible motors on one set of loaders so as to cause a downward cycle of the work engaging hooks through a substantially U-shaped path simultaneously to pick up a work piece from the loading station and from each of the grinding stations and to raise the work pieces to a transferring position, means actuated by the upward movement of the said loader hooks to start all of the motors on the other set of units to initiate a downward cycle of the loader hooks to deposit a work piece at each of the grinding stations and a ground work piece at the unloading station, and means actuated by and in timed relation with movement of said latter hooks to actuate said motor reversing means so as to cause a simultaneous longitudinal movement of the sets of loader units in the opposite directions.

7. In a grinding machine having a loading station, a plurality of spaced grinding stations, one station for each portion on the work piece to be ground, an unloading station, a pair of spaced axially aligned rotatable work supporting chucks on each of said grinding stations, a transversely movable rotatable grinding wheel on each of said grinding stations, a feeding mechanism to move each of said grinding wheels transversely in either direction, and a work loading and transferring mechanism for transferring work pieces between said stations including a pair of spaced parallel horizontal slideways, a set of spaced longitudinally movable work loader units on each of said slideways, means including a fluid motor simultaneously to transverse said sets of loader units in opposite directions, a control valve therefor, a vertically movable slide on each of said units, a pair of spaced work engaging hooks on each of said slides, means including a reversible motor driven chain on each of said units for moving said hooks through a substantially U-shaped path in either direction, means actuated by and in timed relation with the rearward movement of the grinding wheel simultaneously to start all of said reversible motor driven chains on one set of loader units so as to cause a downward cycle of the work engaging hooks through a substantially U-shaped path simultaneously to pick up a work piece from the loading station and from each of the grinding stations and to raise the work pieces to a transfer position, means actuated by the upward movement of said loader hooks to start all of the motors on the other set of loader units to initiate a downward movement of the loader hooks to deposit a work piece at each of the grinding stations and a ground work piece at the unloading station, and means actuated by and in timed relation with movement of said latter hooks to actuate said valve so as to cause a simultaneously longitudinal movement of the sets of loader units in the opposite direction.

References Cited in the file of this patent

UNITED STATES PATENTS

| 2,623,429 | Meyer | Dec. 30, 1952 |
| 2,653,502 | Meyer | Sept. 29, 1953 |